United States Patent [19]

Tomisawa et al.

[11] Patent Number: 5,747,677
[45] Date of Patent: May 5, 1998

[54] APPARATUS AND METHOD FOR DETECTING PRESSURE IN AN ENGINE CYLINDER

[75] Inventors: Naoki Tomisawa; Kenichi Mori, both of Atsugi, Japan

[73] Assignee: Unisia Jecs Corporation, Atsugi, Japan

[21] Appl. No.: 766,936

[22] Filed: Dec. 16, 1996

Related U.S. Application Data

[63] Continuation of Ser. No. 444,096, May 18, 1995, abandoned.

[30] Foreign Application Priority Data

May 27, 1994 [JP] Japan ................. 6-114997

[51] Int. Cl.⁶ ............................. G01M 15/00
[52] U.S. Cl. ................. 73/115; 73/35.12; 324/393; 324/402
[58] Field of Search ................ 73/35.01, 35.07, 73/35.12, 115, 116, 117.3; 324/393, 401, 402

[56] References Cited

U.S. PATENT DOCUMENTS

| | | | |
|---|---|---|---|
| 4,169,388 | 10/1979 | Teitelbaum et al. | 73/115 |
| 4,625,690 | 12/1986 | Morita | 123/340 |
| 4,640,249 | 2/1987 | Kawamura et al. | 123/425 |
| 4,660,535 | 4/1987 | Asano | 123/425 |
| 4,693,221 | 9/1987 | Nakajima et al. | 123/425 |
| 4,744,244 | 5/1988 | Tanaka | 73/115 |
| 4,750,103 | 6/1988 | Abo et al. | 364/431.08 |
| 4,760,825 | 8/1988 | Morita | 123/340 |
| 4,777,920 | 10/1988 | Oshiage et al. | 73/35.04 |
| 4,781,059 | 11/1988 | Suzuki et al. | 73/115 |
| 4,821,194 | 4/1989 | Kawamura | 73/35.13 |
| 4,909,071 | 3/1990 | Amano et al. | 73/115 |
| 4,920,494 | 4/1990 | Abo et al. | 123/425 |
| 4,969,352 | 11/1990 | Sellnau | 73/115 |
| 4,984,905 | 1/1991 | Amano et al. | 73/116 |
| 4,993,388 | 2/1991 | Mitsumoto | 123/425 |
| 4,996,873 | 3/1991 | Takeuchi | 73/115 |
| 5,014,670 | 5/1991 | Mitsumoto | 123/425 |
| 5,067,460 | 11/1991 | Van Duyne | 123/337 |
| 5,101,659 | 4/1992 | Takeuchi | 73/115 |
| 5,101,788 | 4/1992 | Demizu et al. | 123/425 |
| 5,107,815 | 4/1992 | Van Duyne | 123/435 |
| 5,230,316 | 7/1993 | Ichihara et al. | 123/425 |
| 5,311,765 | 5/1994 | Iwakiri | 73/35.03 |
| 5,323,748 | 6/1994 | Foster et al. | 123/435 |
| 5,329,809 | 7/1994 | Sellnau et al. | 73/35.13 |

FOREIGN PATENT DOCUMENTS 63-70049  5/1988  Japan .

*Primary Examiner*—Richard Chilcot
*Assistant Examiner*—Eric S. McCall
*Attorney, Agent, or Firm*—Foley & Lardner

[57] ABSTRACT

An apparatus for detecting pressure in an engine cylinder comprises a cylinder pressure sensor inserted between an ignition plug screwed into an engine cylinder head and a bearing surface on which the ignition plug is mounted. The sensor outputs a detection signal depending upon a change in the sensor load corresponding to a change in the pressure in the cylinder, to detect the pressure in the cylinder based on a detection signal from the cylinder pressure sensor. The detection signal from the cylinder pressure sensor is invalidated for only a predetermined period based on an ignition signal that controls the ignition of the ignition plug so that the S/N ratio in the sensor output will not be deteriorated by the ignition noise.

7 Claims, 5 Drawing Sheets

APPARATUS AND METHOD FOR DETECTING PRESSURE IN AN ENGINE CYLINDER

This application is a continuation of application Ser. No. 08/444,096, filed May 18, 1995, now abandoned.

FIELD OF THE INVENTION

The present invention relates to apparatus and method for detecting pressure in an engine cylinder. More specifically, the invention relates to technology for improving the S/N ratio (signal-to-noise ratio) in the sensor output in using a washer-type cylinder pressure sensor that is inserted between an ignition plug and a bearing surface on which the ignition plug is mounted.

RELATED ART OF THE INVENTION

The state of combustion in an engine has heretofore been detected by detecting the pressure of a combustion gas in a cylinder using a cylinder pressure sensor disclosed in, for example, Japanese Unexamined Utility Model Publication No. 63-70049.

The cylinder pressure sensor disclosed in the above Japanese Unexamined Utility Model Publication No. 63-70049 is made up of a ring-like piezo-electric element and an electrode that are laminated one upon the other. The sensor is sandwiched between an ignition plug screwed into a cylinder head and a bearing surface on which the ignition plug is mounted. The fastening load (sensor load) of the sensor produced by fastening the ignition plug increases or decreases depending upon the pressure (cylinder pressure) in the cylinder acting upon the ignition plug so that the output of the piezo-electric element changes depending upon the cylinder pressure.

In practice, however, the above-mentioned washer-type cylinder pressure sensor is provided close to the ignition plug and, therefore, is subject to the ignition noise emitted from the ignition plug to the surroundings. Besides, the output of the washer-type cylinder pressure sensor is very small since it is constructed to produce a detection output based upon a small displacement of the ignition plug caused by the generation of the combustion pressure. As a result, it is difficult to maintain a high S/N ratio of the sensor output.

To suppress the influence of ignition noise, a shielding wire is used. Here, however, to avoid the influence due to the use of the shielding wire, it is necessary to use an expensive wire having a small electrostatic capacity sensor output characteristics, resulting in the increase of cost of production.

SUMMARY OF THE INVENTION

The present invention is accomplished in view of the above-mentioned problems, and its object is to, in an apparatus for detecting the pressure in a cylinder of an engine and a method thereof using a washer-type cylinder pressure sensor, improve S/N ratio in the sensor output without using expensive shielding wire.

To accomplish the above-mentioned object, the apparatus and method of detecting the pressure in an engine cylinder according to the present invention comprises a cylinder pressure sensor inserted between an ignition plug screwed into an engine cylinder head and a bearing surface on which the ignition plug is mounted and outputs detection signal depending upon a change in the sensor load corresponding to change in the pressure in the cylinder, and detects the pressure in the cylinder based on a detection signal from the cylinder pressure sensor, wherein the detection signal from the cylinder pressure sensor is invalidated for only a predetermined time period based upon an ignition signal that controls the ignition of said ignition plug.

According to the above-mentioned construction, the sensor output may be invalidated during a period in which the ignition noise affects the output of the cylinder pressure sensor so that it is possible to avoid a reduction in the S/N ratio in the sensor output due to the ignition noise.

Here, the output of detection signal from the cylinder pressure sensor is interrupted for the above-mentioned predetermined period of time based on the ignition signal, so that the detection signal is invalidated for the predetermined period.

According to this construction, when the sensor output is interrupted during a period in which the ignition noise is generated, the sensor signal carrying the ignition noise is prevented from being output, and only those sensor outputs not affected by the ignition noise are obtained.

To interrupt the output of detection signals from the cylinder pressure sensor, furthermore, the detection signal output line of the cylinder pressure sensor may be selectively grounded.

According to this construction, the output can be easily halted by switching the ground.

When there is provided a sensor output amplifier means for amplifying the detection signal from the cylinder pressure sensor, furthermore, the amplification operation by the sensor output amplifier means may be halted for only the predetermined period based on the ignition signal, so that the detection signal is invalidated for the predetermined period.

According to this construction, the operation for amplifying the sensor output is halted for a period in which the ignition noise is generated, thereby suppressing the sensor output carrying the ignition noise at a level lower than the normal level to maintain the S/N ratio.

It is further preferable to control the predetermined period for invalidating the detection signal from the cylinder pressure sensor based on a signal obtained by delaying the ignition signal.

According to the above-mentioned construction, the sensor output can be invalidated easily and reliably during a period in which the ignition noise is generated.

According to the present apparatus the detection signal of the cylinder pressure sensor is invalidated for only a predetermined period based on the ignition signal and the sensor output amplifier means is disposed close to the ignition plug.

According to this construction, a portion that receives noise before the sensor output is amplified is shortened as much as possible, and the influence of ignition noise on the sensor output can be suppressed.

According to the present apparatus, a unit, which includes an ignition coil, an ignition coil drive circuit for driving the ignition coil based on an ignition signal and the sensor output invalidating means as a unitary structure, is mounted on the head portion of each ignition plug.

According to this construction, the area that receives the radiation of ignition noise is minimized, thereby suppressing the influence of ignition noise on the sensor output.

Other objects and aspects of the present invention will become apparent from the following description of embodiments in conjunction with the accompanying drawings.

DESCRIPTION OF THE PREFERRED EMBODIMENTS

Embodiments of the present invention will now be described.

Figure 1:
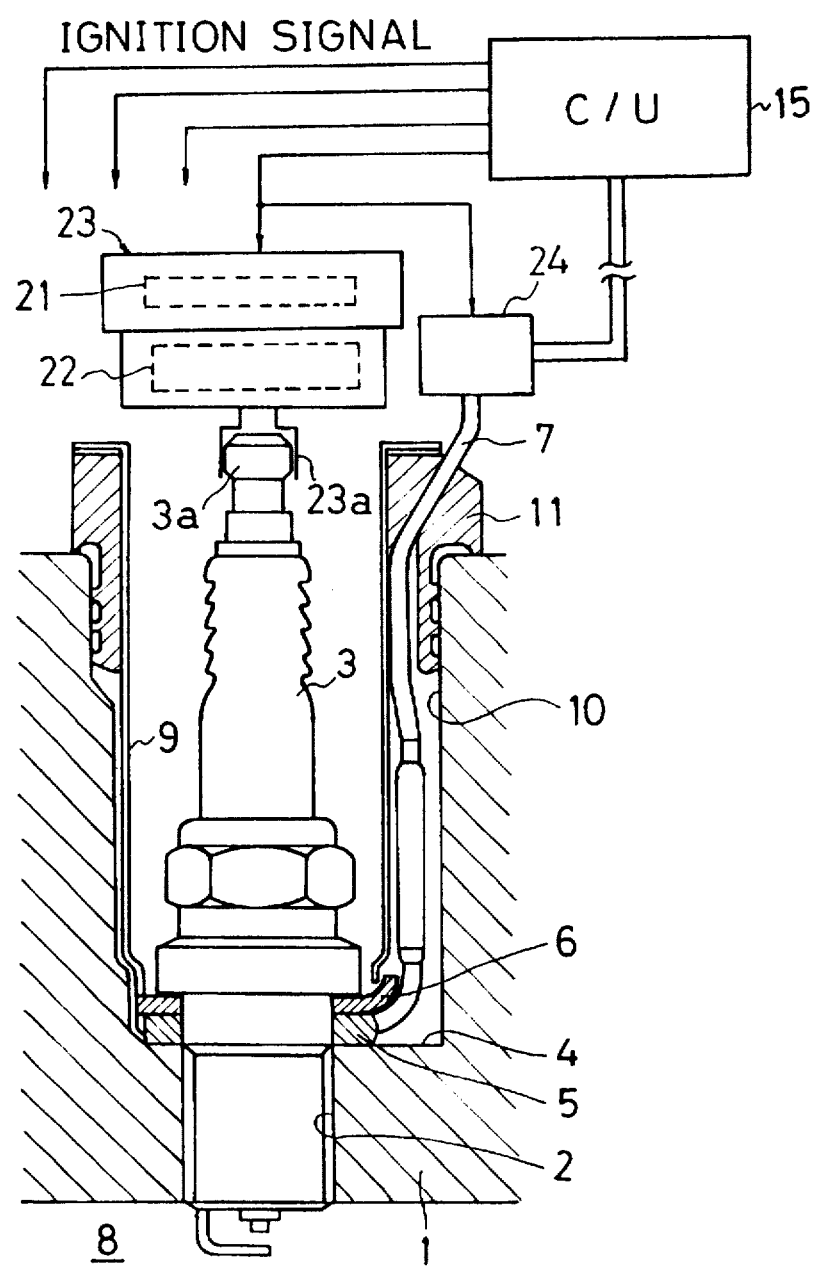
FIG. 1 is schematic system diagram illustrating one embodiment of the present invention.

Referring to FIG. 1, which illustrates a first embodiment, an ignition plug 3 is screwed into a threaded hole 2 formed through an engine cylinder head 1.

A ring-like cylinder pressure sensor 5 is sandwiched between the ignition plug 3 and a bearing surface 4 on which the ignition plug is mounted.

Reference numeral 6 denotes a washer interposed between the cylinder pressure sensor 5 and the ignition plug 3.

The cylinder pressure sensor 5 is made up of two pieces of piezo-electric elements placed up and down with a ring-like center electrode as a center, and an upper electrode and a lower electrode laminated on the outer side thereof, the inner and outer peripheries thereof being covered with an insulating resin material and secured as a unitary structure. A lead wire 7 is taken out from the center electrode passing through the resin material.

As described earlier, the cylinder pressure sensor 5 is fastened as a washer of the ignition plug 3 and is imparted with a predetermined fastening load. When the ignition plug 3 is pushed up by the combustion pressure in the cylinder 8, the sensor load decreases and the pressure in the cylinder can be detected as a relative pressure depending on a reduction in the sensor load with the above-mentioned fastening load as a reference.

A metal pipe 9 has an opening at its lower end where the pressure sensor 5 is inserted so that the outer peripheral portion of the cylinder pressure sensor 5 engages the lower end. The pipe extends toward the base end side of the ignition plug 3 and is inserted into an open end of an ignition plug insertion hole 10 via a rubber bush 11. The lead wire 7 extends along the outer peripheral wall of the metal pipe 9 and is drawn to the external side via a through hole formed in the rubber bush 11.

An ignition unit which includes integrally an ignition coil 21 and an ignition coil drive circuit (including a power transistor) 22 for driving the ignition coil 21 based on an ignition signal, is attached to a terminal 3a of the ignition plug 3 via a terminal 23a that gives a high voltage generated on the secondary side of the ignition coil 21 to the ignition plug 3. That is, the ignition system according to this embodiment has the ignition unit 23 for each of the cylinders and feeds the ignition energy directly to the ignition plug 3 without passing through a high-tension cable, the ignition energy being generated by the ignition coil 21 in response to an ignition signal (conduction control signal for the power transistor) from a control unit 15 that will be described later.

The lead wire 7 for taking out the output of the cylinder pressure sensor 5 is connected to a noise-masking circuit 24 (sensor output invalidating means) provided close to the ignition plug 3, and the sensor output that has passed through the noise-masking circuit 24 is input to the control unit 15.

The noise-masking circuit 24 receives the ignition signal that is fed to the ignition unit 23 and, masks and invalidates the output of the cylinder pressure sensor 5 for a predetermined period of time that is set based on the ignition signal.

Figure 2:
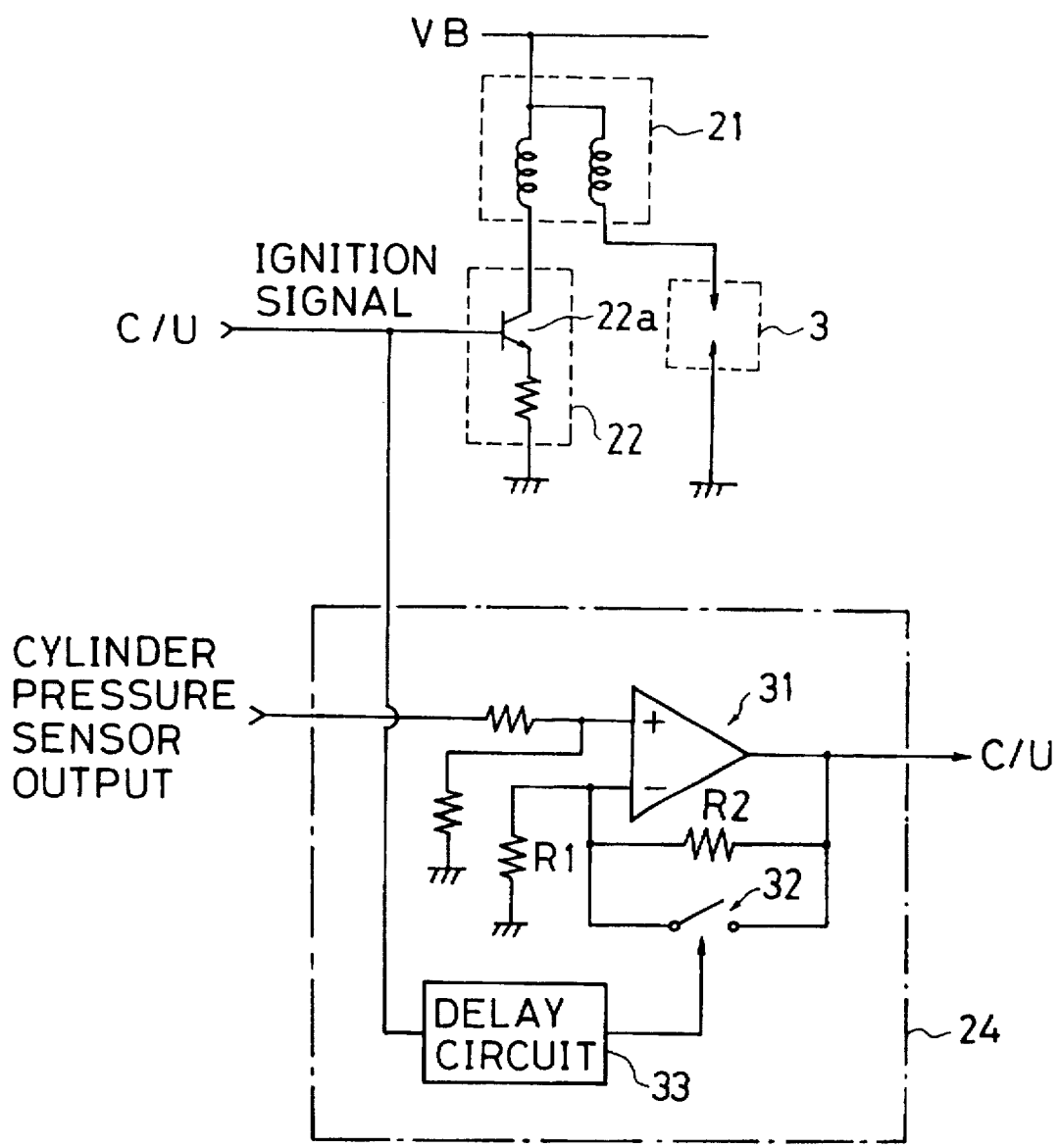
FIG. 2 is a circuit diagram illustrating one embodiment of a noise-making circuit.

Concretely, the noise mask circuit 24 is constructed in a manner as shown in FIG. 2.

In FIG. 2, reference numeral 31 denotes a charge amplifier (feedback amplifier), and a switching element 32 is provided in parallel with a feedback resistor R2 which together with a resistor R1 determines the amplification factor of the charge amplifier 31 (sensor output amplifier means). The switching element 32 is turned on and off by an ignition signal (masking signal) delayed by a delay circuit 33.

The ignition signal, when at the high level, turns a power transistor 22a on. An electric current starts flowing into the primary side of the ignition coil 21 in synchronism with the rise of the ignition signal and is interrupted from flowing into the primary side of the ignition coil 21 in synchronism with the fall of the ignition signal and, at this moment, a high voltage generated on the secondary side is fed to the ignition plug 3 to produce an ignition spark.

Since the delay circuit 33 delays the ignition signal, the switching element 32 is switched from off into on being delayed behind the rise of the ignition signal, and is switched from on into off being delayed behind the fall of the ignition signal (ignition). Therefore, the switching element 32 is turned on for at least a predetermined period of time from the ignition (interruption of current to the primary side), and the amplification operation of the charge amplifier 31 is halted.

Here, so-called ignition noise accompanies the interruption of current to the primary side of the ignition coil 21, i.e., accompanying the ignition operation, and affects the output of the cylinder pressure sensor 5. However, since the amplification operation of the charge amplifier 31 is halted by the switching element 32 for a predetermined period of time from the ignition (see FIG. 3), the sensor output affected by the ignition noise is not amplified and a sensor output having an improved S/N ratio is input to the control unit 15.

With the charge amplifier 31 provided close to the ignition plug 3, the area that receives noise can be minimized between the sensor and the charge amplifier 31, enabling the S/N ratio to be improved during the amplification operation. According to this embodiment, furthermore, the ignition plug 3 and the lead wire 7 are shielded from each other by the metal pipe 9, no ignition noise is picked up by the lead wire 7 during extending up to the charge amplifier 31. Therefore, there is no need of using an expensive shielding wire as the lead wire 7, and the cost of production can be decreased.

In the noise-masking circuit 24 shown in FIG. 2, the sensor output affected by the ignition noise is invalidated by halting the amplification operation. It is, however, also allowable to halt the sensor output affected by the ignition noise by employing a circuit construction shown in FIG. 4.

Figure 4:
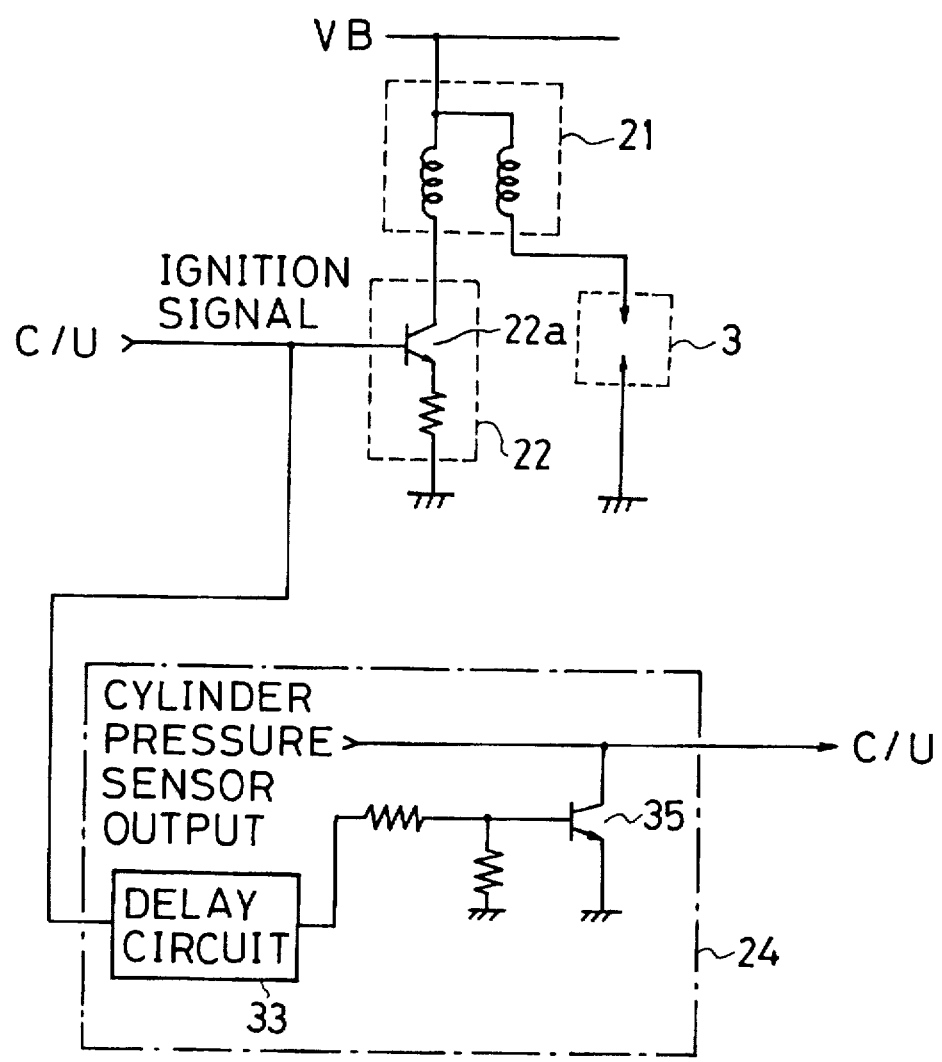
FIG. 4 is a circuit diagram illustrating another embodiment of a noise-making circuit.

A noise-masking circuit 24 shown in FIG. 4 invalidates the output of the cylinder pressure sensor 5 for at least a predetermined period of time from the ignition based on a noise-masking signal generated by the delay circuit 33 in response to the ignition signal in the same manner as described above. Here, however, the sensor output line is selectively grounded by a transistor 35 that is turned on and off by the noise-masking signal.

Figure 3:
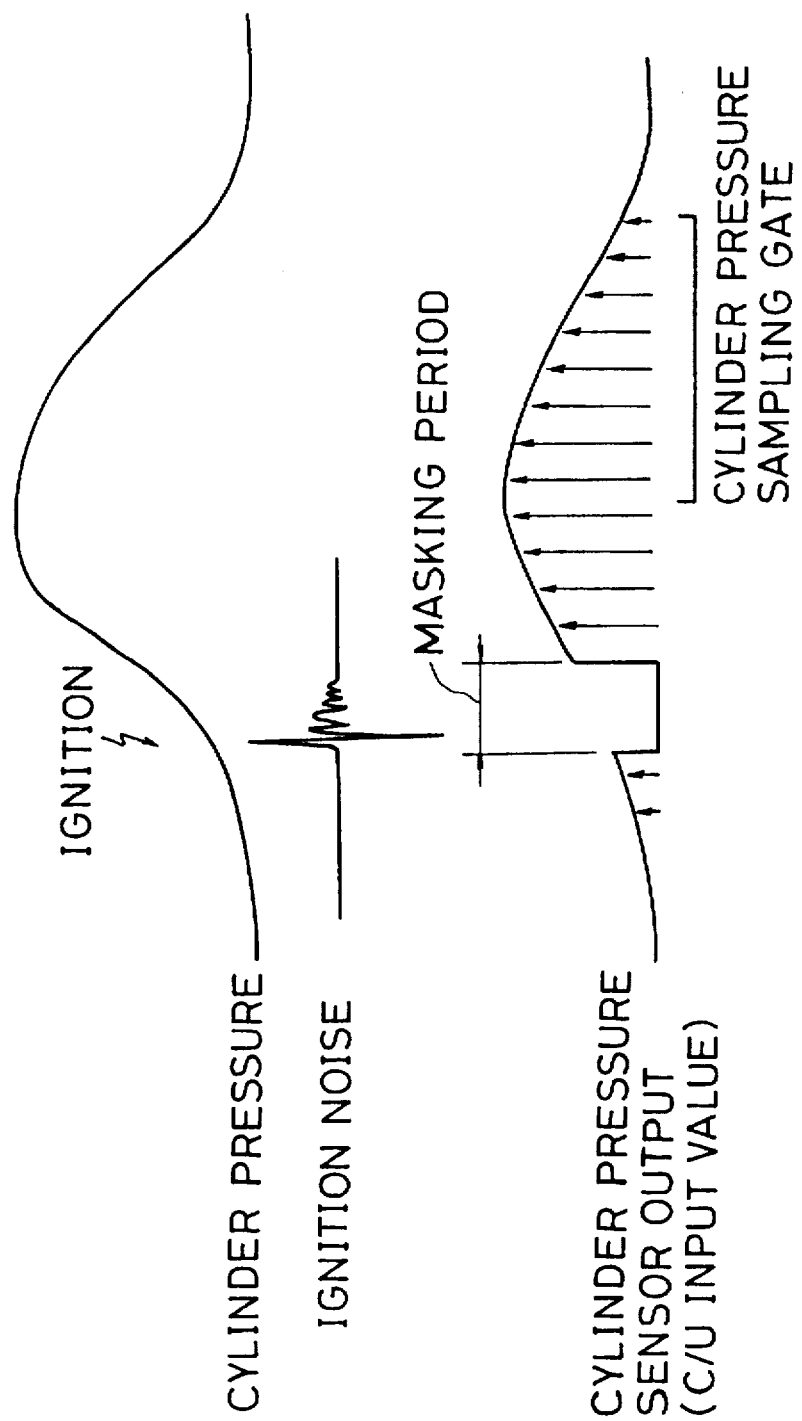
FIG. 3 is a time chart illustrating the manner of masking the sensor output.

That is, in response to an ignition delay signal (masking signal) output from the delay circuit 33, the transistor 35 causes the output line of the cylinder pressure sensor 5 to be grounded for at least a predetermined period of time from the ignition to thereby interrupt the production of the sensor output affected by the ignition noise (see FIG. 3). Even in the noise-masking circuit 24 of the construction shown in FIG. 4, therefore, it is allowed to improve the S/N ratio of the sensor output input to the control unit 15.

Here, the period in which the ignition noise accompanies the ignition is not a period that generally represents the combustion state. Therefore, masking the output of the cylinder pressure sensor 5 (see FIG. 3) as mentioned above, does not affect the detection of combustion state.

Figure 5:
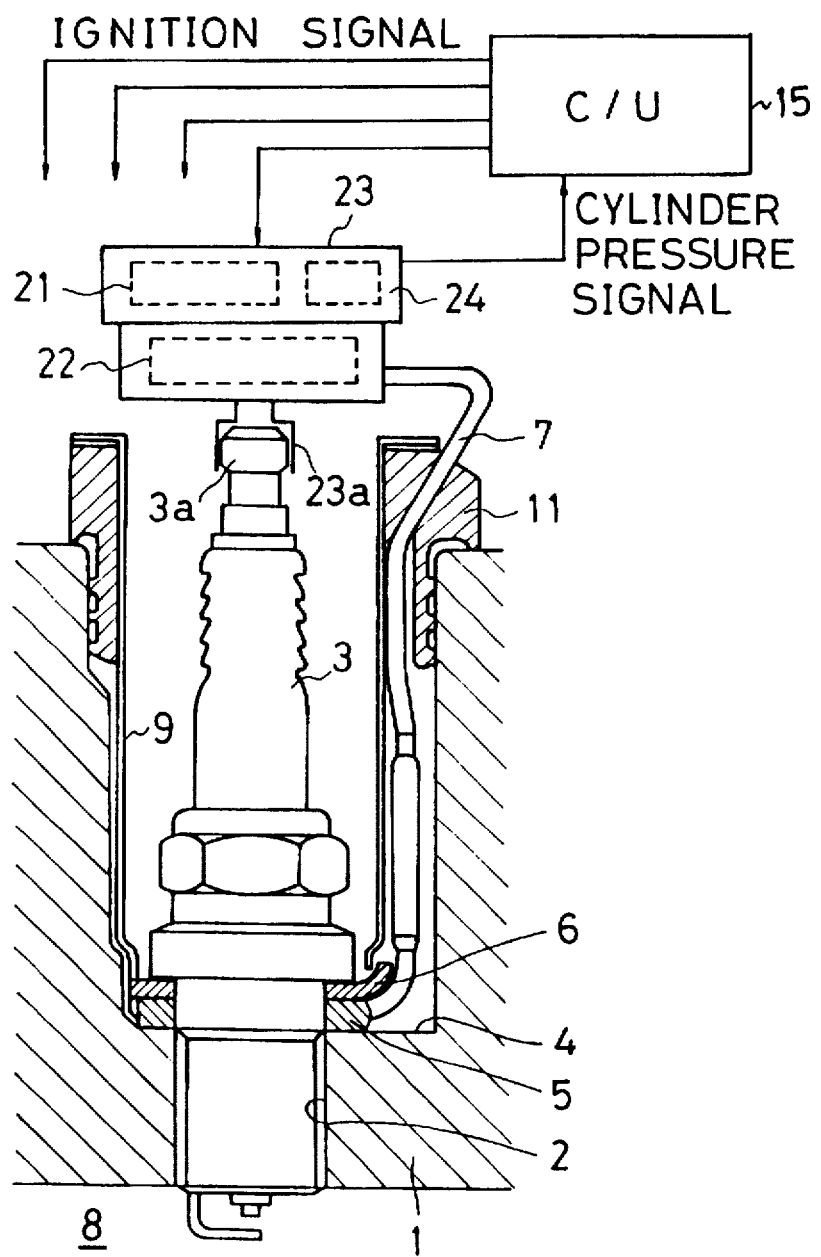
FIG. 5 is a schematic diagram illustrating another embodiment of the system structure.

In the embodiment shown in FIG. 1, the noise-masking circuit 24 is separately provided as shown in FIGS. 2 and 4 with respect to the ignition unit 23, which includes the ignition coil 21 and the ignition coil drive circuit 22. As shown in FIG. 5, however, the noise-masking circuit 24 may be integrally provided in the ignition unit 23.

According to this construction, the noise-masking circuit 24 can be easily installed, and the area that receives the radiation of noise is minimized making it possible to further improve the S/N ratio.

We claim:

1. An apparatus for detecting pressure in an engine cylinder, comprising:
    a cylinder pressure sensor adapted to be inserted between an ignition plug screwed into an engine cylinder head and a bearing surface on which the ignition plug is mounted, the sensor outputting a detection signal corresponding to change in the pressure in the cylinder;
    a power transistor adapted to receive an ignition signal for controlling current to an ignition coil;
    a delay circuit adapted to receive the ignition signal that controls the power transistor for delaying the ignition signal and generating a masking signal for masking the detection signal from said cylinder pressure sensor; and
    a ground circuit for grounding an output line carrying the detection signal from the cylinder pressure sensor in response to the masking signal generated by the delay circuit.

2. An apparatus according to claim 1, including the ignition coil, wherein the ignition coil, the delay circuit, and the grounding circuit are housed as a unit in a unitary structure adapted to be mounted on a head portion of the ignition plug.

3. An apparatus for detecting pressure in an engine cylinder, comprising:
    a cylinder pressure sensor adapted to be inserted between an ignition plug screwed into an engine cylinder head and a bearing surface on which the ignition plug is mounted, the sensor outputting a detection signal corresponding to change in the pressure in the cylinder;
    an amplification circuit for amplifying the detection signal from the cylinder pressure sensor;
    a power transistor adapted to receive an ignition signal for controlling current to an ignition coil;
    a delay circuit adapted to receive the ignition signal that controls the power transistor for delaying the ignition signal and generating a masking signal for masking the detection signal from the cylinder pressure sensor; and
    an amplification halting circuit for halting the amplification circuit from amplifying in response to the masking signal generated from the delay circuit.

4. An apparatus according to claim 3, wherein the amplification circuit is adapted to be mounted to the ignition plug.

5. An apparatus according to claim 3, including the ignition coil, wherein the ignition coil, the amplification circuit, the delay circuit, and the amplification halting circuit are housed as a unit in a unitary structure adapted to be mounted on a head portion of the ignition plug.

6. An apparatus for detecting pressure in an engine cylinder, comprising:
    a cylinder pressure sensor adapted to be inserted between an ignition plug screwed into an engine cylinder head and a bearing surface on which the ignition plug is mounted, the sensor outputting a detection signal corresponding to change in the pressure in the cylinder;
    an ignition coil, wherein an ignition signal controls current to the ignition coil;
    a delay circuit for delaying the ignition signal that controls current to the ignition coil, the delay circuit generating a masking signal for a predetermined period from a start of the ignition signal; and
    a ground circuit for grounding the detection signal from the cylinder pressure sensor in response to the masking signal generated by the delay circuit,
    wherein the ignition coil, the delay circuit, and the ground circuit are housed as a unit in a unitary structure adapted to be mounted on a head portion of the ignition plug.

7. An apparatus for detecting pressure in an engine cylinder, comprising:
    a cylinder pressure sensor adapted to be inserted between an ignition plug screwed into an engine cylinder head and a bearing surface on which the ignition plug is mounted, the sensor outputting a detection signal corresponding to change in the pressure in the cylinder;
    an amplification circuit for amplifying the detection signal from the cylinder pressure sensor;
    an ignition coil, wherein an ignition signal controls current to the ignition coil;
    a delay circuit for delaying the ignition signal that controls current to the ignition coil, the delay circuit generating a masking signal for a predetermined period from a start of the ignition signal; and
    an amplification halting circuit for halting the amplification circuit from amplifying the detection signal from the cylinder pressure sensor in response to the masking signal generated from the delay circuit,
    wherein the ignition coil, the amplification circuit, the delay circuit, and the amplification halting circuit are housed as a unit in a unitary structure adapted to be mounted on a head portion of the ignition plug.

* * * * *